(12) United States Patent
Law

(10) Patent No.: US 6,690,773 B1
(45) Date of Patent: Feb. 10, 2004

(54) RECIPIENT CONTROL OVER ASPECTS OF INCOMING MESSAGES

(75) Inventor: Robert A. Law, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/588,853

(22) Filed: Jun. 6, 2000

(51) Int. Cl.$^7$ .............................................. H04M 1/64
(52) U.S. Cl. ............................. 379/88.22; 379/88.14; 379/201.02
(58) Field of Search ........................ 379/67.1, 88.13, 379/88.14, 88.17, 88.18, 88.19, 88.2, 88.21, 88.22, 88.23, 88.27, 201.01, 201.02

(56) References Cited

U.S. PATENT DOCUMENTS

| | | |
|---|---|---|
| 4,639,873 A | 1/1987 | Baggarly et al. ............ 364/465 |
| 4,725,718 A | 2/1988 | Sansone et al. ............. 235/495 |
| 4,734,865 A | 3/1988 | Scullion et al. ............. 364/478 |
| 4,752,950 A | 6/1988 | Le Carpentier ............. 379/106 |
| 4,797,830 A | 1/1989 | Baggarly et al. ...... 364/464.03 |
| 4,831,554 A | 5/1989 | Storace et al. ............. 364/519 |
| 4,873,645 A | 10/1989 | Hunter et al. ............... 364/479 |
| 4,882,675 A | 11/1989 | Nichtberger et al. ........ 364/401 |
| 4,959,795 A | 9/1990 | Christensen et al. ... 364/464.03 |
| 5,008,827 A | 4/1991 | Sansone et al. ........ 364/464.02 |
| 5,024,153 A | 6/1991 | Bannister et al. ............. 101/91 |
| 5,043,908 A | 8/1991 | Manduley et al. .......... 364/478 |
| 5,053,955 A | 10/1991 | Peach et al. ................. 364/401 |
| 5,058,030 A | 10/1991 | Schumacher ................ 364/478 |
| 5,072,400 A | 12/1991 | Manduley ................... 364/478 |
| 5,168,804 A | 12/1992 | Lee et al. ...................... 101/99 |
| 5,177,687 A | 1/1993 | Baggarly et al. ...... 364/464.03 |
| 5,274,696 A | 12/1993 | Perelman ..................... 379/89 |
| 5,321,604 A | 6/1994 | Peach et al. ................. 364/401 |
| 5,329,578 A | 7/1994 | Brennan et al. ............... 379/67 |
| 5,383,115 A | 1/1995 | Lecarpentier ............... 364/554 |
| 5,384,708 A | 1/1995 | Collins et al. ......... 364/464.02 |
| RE34,915 E | 4/1995 | Nichtberger et al. ........ 364/401 |
| 5,454,038 A | 9/1995 | Cordery et al. ............... 380/23 |
| 5,490,077 A | 2/1996 | Freytag .................. 364/464.02 |
| 5,509,109 A | 4/1996 | Kim et al. .................... 395/114 |
| 5,513,126 A * | 4/1996 | Harkins et al. ............. 364/514 |
| 5,535,126 A | 7/1996 | Mourgues .............. 364/464.02 |
| 5,579,449 A | 11/1996 | Strobel ......................... 395/110 |
| 5,689,642 A * | 11/1997 | Harkins et al. ......... 395/200.04 |
| 5,742,905 A | 4/1998 | Pepe et al. ................... 455/461 |
| 5,761,648 A | 6/1998 | Golden et al. ................. 705/14 |
| 5,781,901 A | 7/1998 | Kuzma et al. ................. 707/10 |
| 5,794,210 A | 8/1998 | Goldhaber et al. ........... 705/14 |
| 5,819,241 A | 10/1998 | Reiter ........................... 705/408 |
| 5,822,739 A | 10/1998 | Kara ............................ 705/410 |
| 5,948,061 A | 9/1999 | Merriman et al. ........... 709/219 |
| 5,963,618 A * | 10/1999 | Porter ........................ 379/88.17 |
| 6,072,862 A * | 6/2000 | Srinivasan ............. 379/100.08 |
| 6,157,924 A | 12/2000 | Austin ........................... 707/10 |
| 6,173,043 B1 * | 1/2001 | Finnigan ................... 379/88.18 |
| 6,330,079 B1 * | 12/2001 | Dugan et al. ................ 358/403 |
| 6,330,308 B1 * | 12/2001 | Cheston, III et al. ..... 379/88.04 |
| 6,330,550 B1 * | 12/2001 | Brisebois et al. .............. 705/75 |
| 6,463,462 B1 * | 10/2002 | Smith et al. ................. 709/206 |

FOREIGN PATENT DOCUMENTS

WO  WO 96/14701  5/1996

\* cited by examiner

*Primary Examiner*—Scott L. Weaver
(74) *Attorney, Agent, or Firm*—Angelo N. Chaclas; George M. Macdonald

(57) ABSTRACT

An information system includes a plurality of messaging systems, a data center and a control system. The plurality of messaging systems process respective messages intended for recipients. The data center is in operative communication with the plurality of messaging systems and stores a recipient preference profile associated with each respective recipient. The control system accessing an intended recipient preference profile corresponding to an intended recipient of a message and uses the intended recipient preference profile to process the message.

14 Claims, 2 Drawing Sheets

RECIPIENT CONTROL OVER ASPECTS OF INCOMING MESSAGES

CROSS REFERENCE TO RELATED APPLICATIONS

This application is related to the following co-pending applications filed concurrently on Jun. 6, 2000 and commonly assigned to the assignee of this application: U.S. patent application Ser. No. 09/588,443, entitled MESSAGING SYSTEM HAVING RECIPIENT PROFILING and U.S. patent application Ser. No. 09/588,763, entitled INFORMATION DELIVERY SYSTEM FOR PROVIDING SENDERS WITH A RECIPIENT'S MESSAGING PREFERENCES, both of which are specifically incorporated herein by reference.

FIELD OF THE INVENTION

This invention relates generally to messaging systems. More particularly, in the preferred embodiments, this invention is directed to techniques allowing a recipient, receiving messages from a plurality of different messaging systems operated by respective senders desiring to communicate with the recipient, to control various aspects of the messages generated by the senders and intended for the recipient.

BACKGROUND OF THE INVENTION

Traditionally, recipients (individuals, businesses and households) have had little opportunity to influence the mail that is sent to them. Merely having a post office address has served as an open invitation to mailers (one type of message senders) wishing to communicate with the recipient. Historically, recipients have been limited in their ability to control any aspects of the mail.

Many factors place increased demands on the effectiveness of messages. First, the costs of generating and delivering messages is always increasing. Second, senders must compete for the recipient's attention due to the large number of messages that are typically received. Third, recipients need timely and easy access to their messages so that they are able to retrieve and discern them efficiently. Numerous other factors exist.

Generally, various postal authorities around the world provided some narrow ability for a recipient to control the mail. One service is mail forwarding (holiday, temporary move, secondary address, etc.) where the mail is redirected from an original address specified by the sender to another address specified by the recipient. This service may be utilized when the recipient moves. Although this service generally works well, it suffers from certain drawbacks and disadvantages. As an example, delays are typically involved in redirecting the mail. Furthermore, the sender is typically unaware of the new address and may continue to send subsequent mail to the old address. Address correction databases that contain updated information about the recipient's address are only updated periodically and must be accessed by the sender to obtain that new information. This delay has potential negative consequences for both the sender and the recipient. As another example, delivery costs for the postal authority are increased because the mail is often routed to the old address before being forwarded to the new address. Therefore, due to all of the above, the sender and the recipient suffer a loss in quality of service while cost for the postal authority increase.

In addition to or as an alternative to notifying the postal authority and described above, the recipient who has moved may attempt to provide various senders with the new address. However, this is time consuming and generally not very effective since it may only pertain to physical mail.

Another type of service is mail holding where the mail is held by the postal authority and not delivered to the recipient. This service may be utilized when the recipient is away from home for a period of time. Although this service generally works well, it suffers from certain drawbacks and disadvantages. As an example, mail tends to collect at the postal authority facilities and this increases storage and handling costs for the postal authority. Furthermore, the sender is typically unaware of the hold that has been placed on delivery and may continue to send subsequent mail believing that the recipient is receiving mail. This compounds the storage problem for the postal authority and the timeliness issue for the sender and the recipient.

Therefore, due to all of the above, the sender and the recipient suffer a loss in quality of service while costs for the postal authority are generally increased. As a result, there is a need for improved recipient control over various parameters associated with messages, in particular mail, intended for a recipient.

SUMMARY OF THE INVENTION

The present invention provides a system and methods for improving the collection and dissemination of recipient preferences for messages. Generally, this is accomplished by collecting recipient preference data and making it available to a plurality of discrete messaging systems for use in preparing messages intended for a selected recipient.

In accordance with the present invention, there is provided a system including a plurality of messaging systems, a data center and a control system. The plurality of messaging systems process respective messages intended for recipients. The data center is in operative communication with the plurality of messaging systems and stores a recipient preference profile associated with each respective recipient. The control system accessing an intended recipient preference profile corresponding to an intended recipient of a message and uses the intended recipient preference profile to process the message.

In accordance with the present invention, a method of operating a data center and a data structure are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
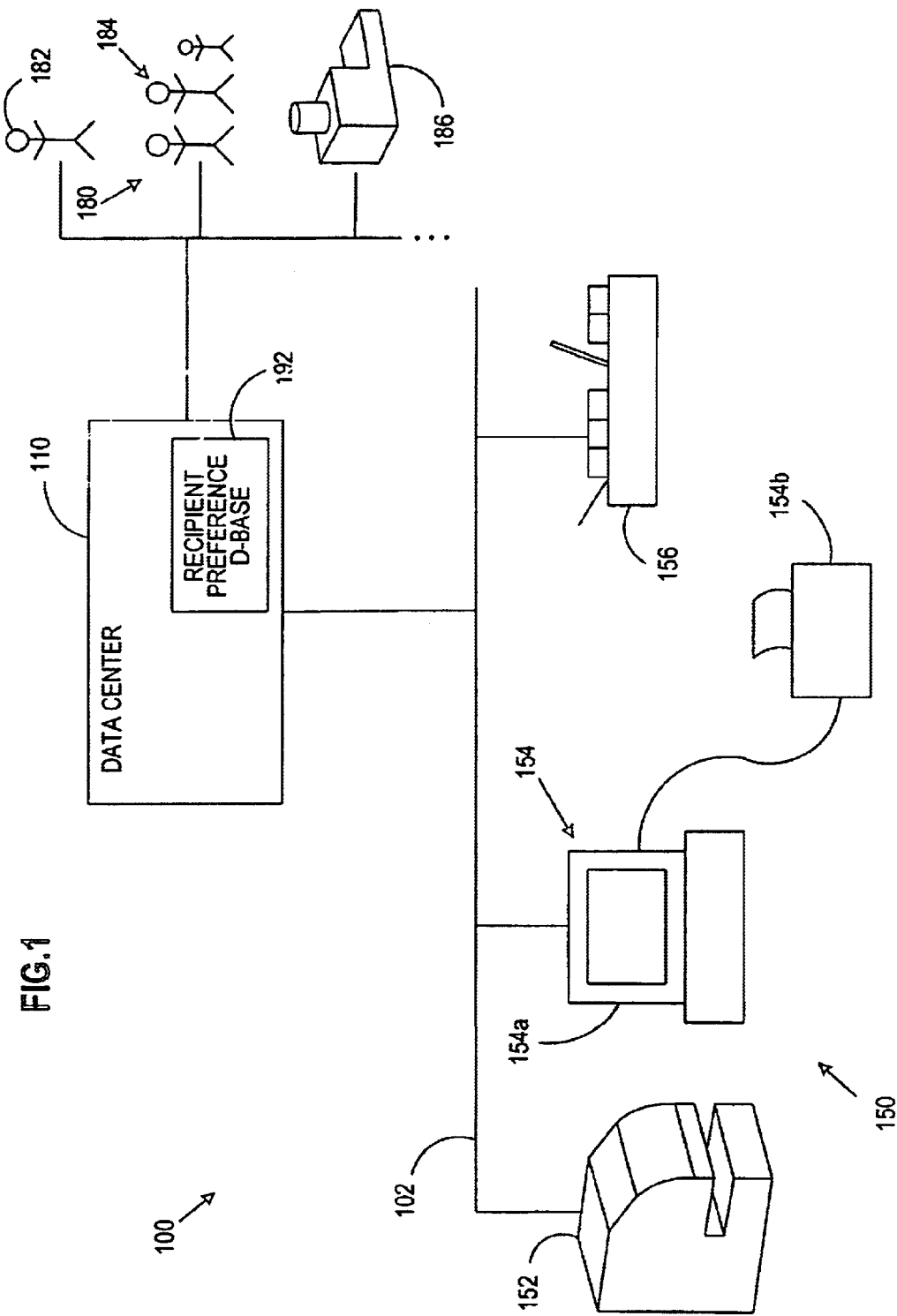
FIG. 1 is a simplified representation of a system including a data center, a plurality of distributed messaging systems and a plurality of recipients, both in electronic communication with the data center, in which the present invention may be incorporated.

Referring to FIG. 1, an example of a system 100 for collecting message preference data from recipients 180 and providing those preferences to senders of messages, in which the present invention may be incorporated, is shown. The information system includes a data center 110 in communication over any suitable communication network 102 (LAN, WAN, telephone line, Internet, etc.) with a plurality of remotely located (geographically dispersed) messaging systems 150 and a plurality of remotely located recipients 180. The messaging systems 150 may include any device that is utilized by a sender (not shown) to produce a message (not shown) intended for a recipient 180 (described in greater detail below). Examples of messaging systems are: a traditional postage meter 152, such as the Personal Post™ meter; an open system postage meter 154, such as the ClickStamp™ online postage system employing a personal computer 154a and a dot matrix (laser, ink jet, thermal transfer, etc.) printer 154b; and an inserter 156, such as the 8 Series™ inserting system; all available from Pitney Bowes of Stamford, Conn. Still other examples of messaging systems are shipping and logistics systems (not shown), addressing systems, such as the AddressRight™ system available from Pitney Bowes of Stamford, Conn., electronic mail (not shown) and the like. Because messaging systems are well know, there descriptions have been limited for the sake of brevity to only that which is necessary to provide suitable background for an understanding of the present invention.

Generally, it is anticipated that the messaging systems 150 would be located primarily in business offices and in private residences and used for a variety of purposes, including message creation, addressing, output generation and/or delivery. The data center 110 is maintained and operated by an administrative agency (not shown), such as the supplier of the messaging systems 150, and may communicate with the messaging systems 150 in a variety of different ways. Those skilled in the art will recognize that not each messaging system 150 need utilize the same type of communication network 102 in contacting the data center 110. Furthermore, depending on the needs of each messaging system 150, the messaging systems 150 may or may not need full time access to the data center 110 to perform their respective tasks. The data center 110 may employ any suitable combination of computer hardware and software (control system) to facilitate the storage, access and processing of information and various communications that are required as described below.

In conventional fashion, the messaging systems 150 are used by their respective operators to perform one or more of the steps in the messaging process (creation, addressing, output generation, delivery, etc.). For example, the traditional postage meter 152 and the open system postage meter 154 may be used to apply a postal indicia (not shown) on an envelope (not shown) that contains a letter (not shown) for delivery to a recipient 180. The postal indicia typically includes at least date and postage value data. The inserter 156 may be used to create, assemble, fold and/or insert a document (not shown) into an envelope (not shown) for subsequent delivery. Therefore, the inserter 156 may have information pertaining to the content of the envelope and the recipient 180 of the envelope. In analogous fashion, the other types of messaging systems 150 all have access to various data about the messages that they process. Those skilled in the art will appreciate that the types of data available are quite varied and ever increasing as newer more intelligent products are being introduced. Those skilled in the art will also appreciate that the messaging systems 150 each have their own suitable combination of computer hardware and software (control system) that operates to control the functioning of the messaging system 150 and communicate, as necessary, with the data center 110.

The recipients 180 may be an individual 182, a household 184, a business 186 or any other entity or organization that receives messages. The recipients may communicate with the data center 110 in any conventional manner. As examples, the recipients 180 may communicate with an automated voice response system (not shown) over conventional telephone lines or via a web site located via a global communication network. Each of the recipients 180 establishes a recipient preference profile (see FIG. 2 and description below) that may be stored in the data center 110 in a recipient preference profiles database 192. As necessary, the recipients 180 may access their profiles in order to make corrections and/or changes to any information in their respective preference profiles.

Figure 2:
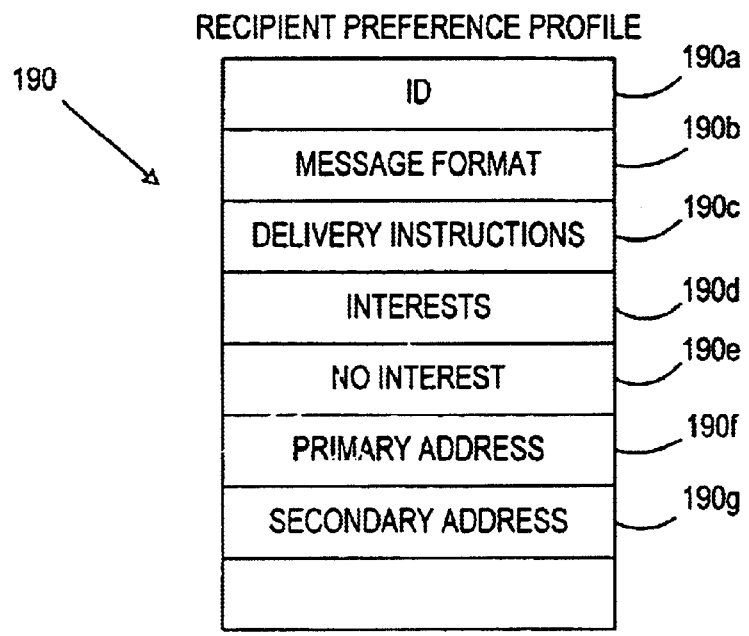
FIG. 2 is a schematic representation of a template for a recipient preference profile describing various parameters intended to control aspects of messages sent by the senders that are intended for the recipient, in accordance with the present invention.

Referring to FIG. 2 in view of FIG. 1, a template for a recipient preference profile 190 is shown. The recipient preference profile 190 is preferably stored in any suitable memory device (database server, memory farm, hard disk, etc.) and defines various parameters intended to control aspects of messages sent by the senders that are intended for the recipient. Those skilled in the art will recognize that the parameters defined below are mutually exclusive and may be employed in any combination. In conventional fashion, the recipient preference profiles 190 may be accessed by any suitable technique, such as an application software program executed by the data center 110 control system. The recipient preference profile 190 may include: a recipient identifier or ID data 190a; message format data 190b; delivery instruction data 190c; interest data 190d; no interest data 190e; primary address data 190f and secondary address data 190g. The recipient ID data 190a may be a name (individual, household or business) or any other suitably unique identifier (alphanumeric, etc.) and simply distinguishes the recipient 180 from other recipients 180. The message format data 190b may indicate the recipient's preferred mode of communication (physical mail, electronic mail, facsimile transmission, voice mail, etc.), combination of modes of communication and/or priority for modes of communication in which to receive messages. The delivery instruction data 190c indicates if any optional delivery preferences, such as: hold messages, temporary reroute messages, etc.; are active. For example, a hold message instruction may be utilized by the recipient 180 when the recipient 180 is not available (vacation, business travel, etc.) to receive messages. As another example, the temporary reroute messages instruction may be utilized by the recipient 180 when the recipient 180 wished to have messages sent to an alternate address 190g (described below) during selected time periods, such as: vacation addresses and the like. The interest data 190d indicates if the recipient 180 has any desire to hear from particular types of senders. The no interest data 190e indicates if the recipient 180 has any desire to not hear from particular types of senders. The primary address data 190f represents the default address (postal delivery, electronic mail, phone number, etc.) to which messages should be sent. If the recipient 180 moves, then the primary address data 190f may be updated by the recipient 180 to reflect a new address. Analogously, the secondary address data 190g represents an alternate address to which messages should be sent if directed so by the delivery instruction data 190c.

The interest data 190d and the no interest data 190e include indications of types of industry segments that the recipient may or may not, respectively, wish to hear from. These data 190d and 190e may be captured in any conventional manner. One system for available for use is the Standard Industry Code (SIC) system that assigns SIC numbers for a variety of well known industry segments. As examples, automobile rental companies would be assigned a SIC number in the range of 2100 to 2199, while automobile dealerships would be assigned a SIC number in the range of 2400–2499 and service stations would be assigned a SIC number in the range of 4000 to 4099. Still other SIC numbers exist for financial institutions, health care providers, legal service providers, professional associations, utility service providers, governmental agencies and a variety of other industry segments. Accordingly, SIC numbers corresponding to industries that the recipient 180 desires to hear from could be placed in the interest data 190d while SIC numbers corresponding to industries that the recipient 180 does not want to hear from could be placed in the no interest data 190e.

Figure 3:
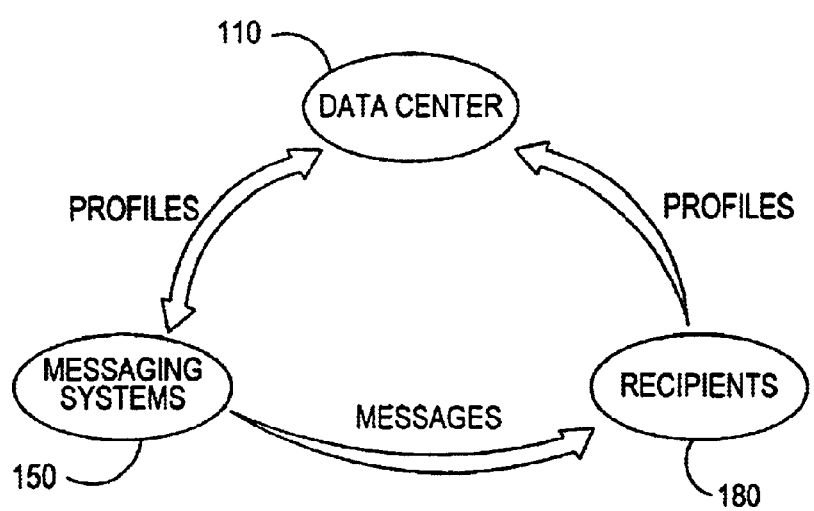
FIG. 3 is a schematic diagram of information flow between recipients, the data center and the messaging systems that facilitates recipient influenced messaging in accordance with the present invention.

With the structure of the information system 100 described as above, the operational characteristics will now be described with respect to how recipient preference profiles 190 are generated by the recipients and potentially used by the messaging systems 150. Referring primarily to FIG. 3 while referencing the structure of FIGS. 1 and 2, a schematic diagram of the information flow between the recipients 180, the data center 110 and the messaging systems 150 that facilitates recipient influenced messaging in accordance with the present invention is shown.

Generally, the recipients 180 establish their respective recipient preference profiles 190 with the data center 110 in any conventional manner. These profiles 190 are then accessed by the messaging systems 150 at any time prior to dispatching a message for delivery to a particular recipient 180. The messaging systems 150 may access the profiles 190 through real time communication with the data center 110 or by downloading the profiles 190 to the messaging system 150 for subsequent use. In a most preferred aspect of the present invention, the database of recipient profiles 190 is downloaded to each messaging system 150 at periodic intervals. During the message creation process (content creation, addressing, output generation, etc.), the messaging system 150 determines if a profile 190 exists for an intended recipient 180. If not, then the messaging system 150 continues normal operation. On the other hand, if a profile 190 corresponding to the intended recipient 180 does exist, then the messaging system 150 utilizes the data 190a–190g provided in the intended. recipients profile 190 to control the messaging process. For example, if the intended recipients profile 190 indicates a preferred form of communication in the message format data 190b, then the messaging selects that form of communication (if available). This has the benefit of allowing the intended recipient 180 to control the format of messages that it will receive. Those skilled in the art will recognize that not each type of messaging system 150 will be capable of executing each form of communication. As another example, if the primary address data 190f is different from the address that was previously available to the messaging system 150, then the messaging system 150 adopts the address provided by the primary address data 190f. This has the benefit of providing faster updating of new addresses to senders and allows for updates to occur at a single source. Thus, the delays and costs associated with the traditional practices described above are substantially alleviated.

Delivery instruction data 190c may also be established by the recipients 180 and utilized by the messaging systems 150 to more efficiently route messages to the intended recipient 180. If a temporary reroute messages instruction is provided, then the senders via their messaging systems 150 can utilize the secondary address data 190g as a destination address for the intended recipient 180 over a specified period of time. In this manner, delays and extra handling as discussed above are eliminated. If a hold messages instruction is provided, then the messaging systems 150 will not dispatch the messages for delivery. In this manner, the storage costs for the carrier are eliminated. Also, the sender has an opportunity to consolidate messages that are generated during this interval into a single comprehensive message at potentially less cost than dispatching individual messages. The messaging systems 150 may facilitate this by keeping a track of messages that have been held and giving the sender an opportunity to consolidate messages directed to the same intended recipient 180 that are waiting for dispatch.

The interest data 190d and the no interest data 190e may also be established by the recipients 180 and utilized by the messaging systems 150 to more effectively route messages to the intended recipient 180. Using the interest data 190d, the senders may scan the profiles 190 looking for recipients that are likely to be interested in their messages (solicitations, informational communication, etc.). Thus, the senders would achieve greater effectiveness on their message delivery programs because they would have an indication the certain recipients 180 have a previously acknowledged interest in a particular industry or industries. On the other hand, using the no interest data 190e, the senders may also increase the effectiveness of their message delivery programs while reducing costs. While scanning the profiles 190 in general or accessing profiles 190 for recipients 180 that have already be designated to receive a message, the sender may terminate further processing of certain messages by out sorting any recipients 180 that have provided an indication that they are not likely to be interested in any messages (solicitations, information communication, etc.) from a particular industry or industries. In other words, messages intended for such recipients will be terminated (not generated, not dispatched, etc.). This may be achieved automatically by including in the messaging systems 150 an indication of the senders SIC number. Thus, the SIC numbers supplied by the recipients as no interest data may be compared with the SIC numbers assigned to the senders. Thus, the senders would save costs by foregoing to dispatch any messages to these recipients 180. Additionally, these recipients 180 benefit in that they are not distracted by the receipt of undesired messages.

As an optional feature, an original sender that has been designated in the no interest data 190e by a recipient 180 may not necessarily terminate messages intended for the recipient 180. The original sender may utilize the interest data 190d from of the recipient 180 to locate an alternate sender to serve as the primary contact with the recipient 180. Thus, the original sender and the alternate sender may collaborate on dispatching a message to the recipient 180. As an example, if a recipient 180 designates financial service companies in its no interest data 190e and home improvement companies in its interest data 190e, then a financial service company may partner with a home improvement company on sending a message to the recipient 180. In this example, the home improvement company (alternate sender) may take the "lead" on the message by describing various home improvement products and/or services that it provides while indicating that, if needed, a second mortgage line of credit to cover the costs associated with the home improvements are also available from their partner (original sender). As another example, the original sender may still dispatch a message to the recipient without directly contacting a partner. To continue the theme introduced above, the original sender may focus the message on obtaining a second mortgage line of credit to cover the costs associated with the home improvements and then provide a listing of home improvement specialists in proximity to the recipients 180.

Thus, it should now be understood that messages from senders falling into "no interest" categories might be modified in several ways. The examples have been discussed above are: (i) terminating the messages; (ii) redirecting the message as originating from a source other than the original sender; and (iii) editing the message to suit an interest of the recipient.

Based on the above description and the associated drawings, it should now be apparent that the present invention improves many aspects of the messaging industry by letting recipients directly control the flow of messages.

Many features of the preferred embodiment represent design choices selected to best exploit the inventive concept as implemented in a particular messaging environment as pertaining to individual private recipients. However, those skilled in the art will recognize that various modifications can be made without departing from the spirit of the present invention to adapt the concepts of the present invention to address situations where the recipient is a business. For example, a wide variety of database management tools exist that can facilitate access to the recipient preference profiles. The exact manner in which these activities occur is subject to great variation due to practical design choices of the hardware, software, communications and data involved. As another example, the control systems of the data center 110 and the messaging systems 150 may operate cooperatively such that various tasks and operations described above may occur at either location. As yet another example, the data center 110 may operate as the message dispatcher. Thus, the messaging systems 150 generate the messages and upload them to the data center 110. Then, the data center reconciles the messages with the recipient preference profiles 190 and takes appropriate measures when dispatching or not dispatching the messages as discussed above.

Therefore, the inventive concept in its broader aspects is not limited to the specific details of the preferred embodiments described above, but is defined by the appended claims and their equivalents.

What is claimed is:

1. A system, comprising:
   a plurality of messaging systems for processing respective messages intended for recipients;
   a data center in operative communication with the plurality of messaging systems for storing a recipient preference profile associated with each respective recipient; and
   a control system for:
      accessing an intended recipient preference profile corresponding to an intended recipient of a message; and
      using the intended recipient preference profile to process the message, wherein
         the recipient preference profile provides a primary address where messages are generally directed, a secondary address and a message rerouting instruction including a specified time period; and
         the control system is further for dispatching messages to the secondary address during the specified time period.

2. A system, comprising:
   a plurality of messaging systems for processing respective messages intended for recipients;
   a data center in operative communication with the plurality of messaging systems for storing a recipient preference profile associated with each respective recipient; and
   a control system for:
      accessing an intended recipient preference profile corresponding to an intended recipient of a message; and
      using the intended recipient preference profile to process the message, wherein
         the recipient preference profile includes no interest data pertaining to senders that the intended recipient does not wish to receive messages from; and
         the control system is further for not dispatching messages to the intended recipient if the messaging system is operated by a sender described by the no interest data.

3. A system, comprising:
   a plurality of messaging systems for processing respective messages intended for recipients;
   a data center in operative communication with the plurality of messaging systems for storing a recipient preference profile associated with each respective recipient; and
   a control system for:
      accessing an intended recipient preference profile corresponding to an intended recipient of a message; and
      using the intended recipient preference profile to process the message, wherein
         the recipient preference profile provides a message hold instruction; and
         the control system is further for not dispatching messages to the intended recipient while the message hold instruction is active.

4. The system of claim 3, wherein:
   the control system is further for collecting discrete messages directed to the intended recipient while the hold instruction is active and consolidating the collected discrete messages into a composite message for delivery to the intended recipient when the hold instruction is not active.

5. A method of operating a data center, the method comprising:
   communicating with a plurality of messaging systems, the messaging systems for processing respective messages intended for recipients;
   storing respective recipient preference profiles established by the recipients;

providing an intended recipient preference profile corresponding to an intended recipient of a message for use by a messaging system in processing the message; and including within the recipient preference profile a primary address where messages are generally directed, a secondary address and a message rerouting instruction including a specified time period wherein messages produced by the messaging systems are to be dispatched to the secondary address during the specified time period.

6. A method of operating a data center, the method comprising:

communicating with a plurality of messaging systems, the messaging systems for processing respective messages intended for recipients;

storing respective recipient preference profiles established by the recipients;

providing an intended recipient preference profile corresponding to an intended recipient of a message for use by a messaging system in processing the message;

including within the recipient preference profile an indication of a preferred format for messages and wherein messages produced by the messaging systems are to be dispatched to the intended recipient in the preferred format; and including within the recipient preference profile no interest data pertaining to senders that the intended recipient does not wish to receive messages from and wherein messages produced by the messaging systems are not to be dispatched to the intended recipient if the messaging systems are operated by a sender described by the no interest data.

7. A method of operating a data center, the method comprising:

communicating with a plurality of messaging systems, the messaging systems for processing respective messages intended for recipients;

storing respective recipient preference profiles established by the recipients;

providing an intended recipient preference profile corresponding to an intended recipient of a message for use by a messaging system In processing the message; and including within the recipient preference profile a message hold instruction and wherein messages produced by the messaging systems are not to be dispatched to the intended recipient while the, message hold instruction is active.

8. The method of claim 7, further comprising the step(s) of:

collecting discrete messages directed to the intended recipient while the hold instruction is active and consolidating the collected discrete messages into a composite message for delivery to the intended recipient when the hold instruction is not active.

9. A memory device accessible by an application program being executed on a control system, comprising:

a recipient preference profile, established by a recipient, including parameters intended to control aspects of messages produced by a plurality of senders that are intended for the recipient;

no interest data pertaining to selected senders that the recipient does not wish to receive messages from and wherein messages are not produced by the selected senders described by the no interest data; and a message hold instruction and wherein messages produced by the plurality of senders are not to be dispatched to the recipient while the message hold instruction is active.

10. The memory device of claim 9, further comprising:

a primary address where messages are to be generally directed, a secondary address and a message rerouting instruction Including a specified time period wherein messages produced by the plurality of senders are to be dispatched to the secondary address during the specified time period.

11. The memory device of claim 9, further comprising:

an indication of a preferred format for messages and wherein messages produced by the plurality of senders are to be dispatched to the recipient in the preferred format.

12. The memory device of claim 9, further comprising:

no interest data pertaining to selected senders that the recipient does not wish to receive messages from and wherein messages produced by the selected senders are not to be dispatched to the recipient.

13. The memory device of claim 9, further comprising:

a message hold instruction and wherein messages produced by the plurality of senders are not to be dispatched to the recipient while the message hold instruction is active.

14. The memory device of claim 13, further comprising:

discrete messages collected while the hold instruction is active and a composite message consolidating the discrete messages into a single message to be delivered to the recipient when the hold instruction is not active.

* * * * *

(12) INTER PARTES REEXAMINATION CERTIFICATE (1034th)

United States Patent
Law

(10) Number: US 6,690,773 C1
(45) Certificate Issued: Jan. 22, 2015

(54) RECIPIENT CONTROL OVER ASPECTS OF INCOMING MESSAGES

(75) Inventor: Robert A. Law, Ridgefield, CT (US)

(73) Assignee: Pitney Bowes Inc., Stamford, CT (US)

Reexamination Request:
No. 95/001,302, Jan. 22, 2010

Reexamination Certificate for:
Patent No.: 6,690,773
Issued: Feb. 10, 2004
Appl. No.: 09/588,853
Filed: Jun. 6, 2000

(51) Int. Cl.
*G07B 17/00* (2006.01)
*G06Q 10/00* (2012.01)

(52) U.S. Cl.
USPC .................. 379/88.22; 379/201.02; 379/88.14

(58) Field of Classification Search
None
See application file for complete search history.

(56) References Cited

To view the complete listing of prior art documents cited during the proceeding for Reexamination Control Number 95/001,302, please refer to the USPTO's public Patent Application Information Retrieval (PAIR) system under the Display References tab.

*Primary Examiner* — Charles Craver

(57) ABSTRACT

An information system includes a plurality of messaging systems, a data center and a control system. The plurality of messaging systems process respective messages intended for recipients. The data center is in operative communication with the plurality of messaging systems and stores a recipient preference profile associated with each respective recipient. The control system accessing an intended recipient preference profile corresponding to an intended recipient of a message and uses the intended recipient preference profile to process the message.

Attention is directed to the decision of *Pitney Bowes Inc. et al v. Zumbox, Inc. U.S. Dist - California Central (Western Div - Los Angeles)* 2:09cv7373 relating to this patent. This reexamination may not have resolved all questions raised by this decision. See 37 CFR 1.552(c) for *ex parte* reexamination and 37 CFR 1.906(c) for *inter partes* reexamination.

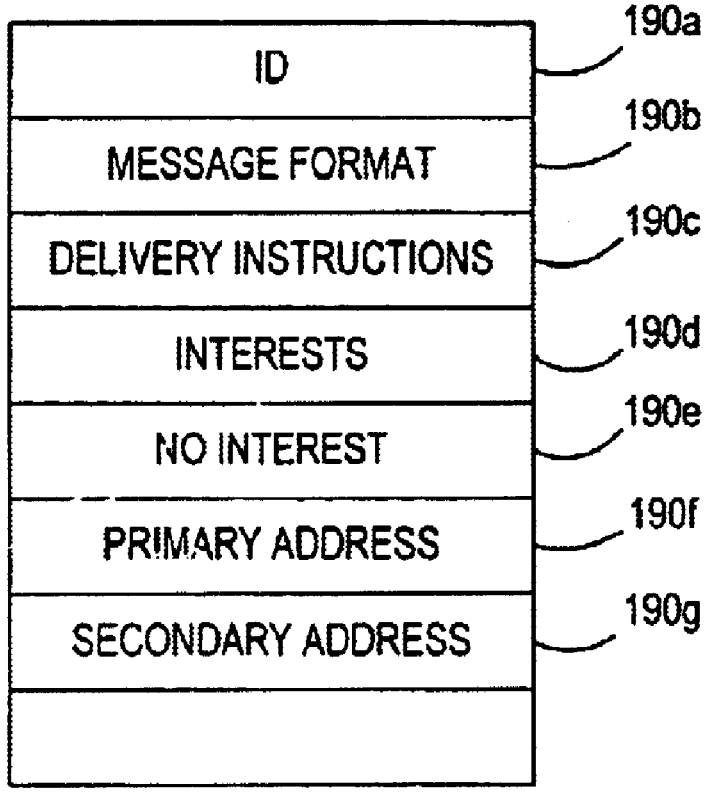

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 5-14 are cancelled.

Claim 3 is determined to be patentable as amended.

Claim 4, dependent on an amended claim, is determined to be patentable.

New claims 15 and 16 are added and determined to be patentable.

3. A system, comprising:
   a plurality of messaging systems for processing respective messages intended for recipients;
   a data center in operative communication with the plurality of messaging systems for storing a recipient preference profile associated with each respective recipient; and *the plurality of messaging systems each including* a control system for:
      accessing an intended recipient preference profile corresponding to an intended recipient of a message; and
      using the intended recipient preference profile to process the message,
      wherein the recipient preference profile provides a message hold instruction; and
      the control system is further for not dispatching messages to the intended recipient while the message hold instruction is active.

*15. A system, comprising:*
*a plurality of messaging systems for processing respective messages intended for recipients;*
*a data center in operative communication with the plurality of messaging systems for storing a recipient preference profile associated with each respective recipient; and*
*the plurality of messaging systems each including a control system for:*
   *accessing an intended recipient preference profile corresponding to an intended recipient of a message; and*
   *using the intended recipient preference profile to process the message,*
      *wherein the recipient preference profile includes no interest data pertaining to senders that the intended recipient does not wish to receive messages from; and*
      *the control system is further for not dispatching messages to the intended recipient if the messaging system is operated by a sender described by the no interest data.*

*16. The system of claim 2, wherein:*
*providing access for the plurality of messaging systems to the at least one of the recipient preference profiles associated with each respective recipient includes downloading a database of recipient profiles to the plurality of messaging systems at periodic intervals.*

\* \* \* \* \*